United States Patent
Terunuma et al.

[11] Patent Number: 6,040,965
[45] Date of Patent: *Mar. 21, 2000

[54] THIN FILM MAGNETIC HEAD HAVING GROOVES WHICH BECOME GRADUALLY SHALLOWER

[75] Inventors: Koichi Terunuma, Hoya; Akifumi Kamijima, Tokyo, both of Japan

[73] Assignee: TDK Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/917,801

[22] Filed: Aug. 27, 1997

[30] Foreign Application Priority Data

Aug. 28, 1996 [JP] Japan .................................. 8-227214

[51] Int. Cl.[7] ....................................................... G11B 5/31
[52] U.S. Cl. ........................................... 360/122; 360/103
[58] Field of Search .................................... 360/119, 122, 360/126, 103, 113

[56] References Cited

U.S. PATENT DOCUMENTS

| | | | |
|---|---|---|---|
| 5,452,166 | 9/1995 | Aylwin et al. | 360/126 |
| 5,475,553 | 12/1995 | Saliba | 360/122 |
| 5,558,944 | 9/1996 | Terunuma | 428/611 |
| 5,574,606 | 11/1996 | Kimura | 360/122 |
| 5,590,008 | 12/1996 | Tanabe et al. | 360/126 |
| 5,675,453 | 10/1997 | Matsuzawa et al. | 360/103 |
| 5,687,045 | 11/1997 | Okai et al. | 360/122 |
| 5,717,551 | 2/1998 | Negishi et al. | 360/122 |
| 5,726,841 | 3/1998 | Tong et al. | 360/122 |
| 5,751,517 | 5/1998 | Agarwal | 360/103 |
| 5,844,749 | 12/1998 | Sakai et al. | 360/103 |

FOREIGN PATENT DOCUMENTS

| | | |
|---|---|---|
| 0452846 | 10/1991 | European Pat. Off. . |
| 3-40278 | 2/1991 | Japan ................ 360/103 |
| 3-296907 | 12/1991 | Japan . |
| 50266429 | 10/1993 | Japan . |
| 6-150278 | 5/1994 | Japan . |

*Primary Examiner*—Brian E. Miller
*Attorney, Agent, or Firm*—Oblon, Spivak, McClelland, Maier & Neustadt, P.C.

[57] ABSTRACT

A slider is provided with air bearing surfaces and at the side that faces opposite the medium. Inductive thin film magnetic conversion elements are each provided with pole tips which emerge at the air bearing surfaces. The width of the pole tips in the direction of the tracks, which is perpendicular to the direction of the movement of the medium, is essentially defined by grooves formed at the air bearing surfaces. The grooves gradually become shallower along the direction of the movement of the medium until their bottom surfaces reach the level of the air bearing surfaces.

18 Claims, 7 Drawing Sheets

THIN FILM MAGNETIC HEAD HAVING GROOVES WHICH BECOME GRADUALLY SHALLOWER

BACKGROUND OF THE INVENTION

1. Field of the Invention

The present invention relates to a thin film magnetic head employed in a magnetic recording reproduction apparatus such as a magnetic disk drive.

2. Discussion of Background

A thin film magnetic head that is mainly employed in a magnetic disk device constituting a computer storage apparatus must be able to support a high recording density. One effective means for supporting a high recording density is to increase track density. As a means for achieving this, Japanese Unexamined Patent Publication (KOKAI) No. 296907/1991, for instance, discloses a technology through which the recording track width or the reproduction track width of a thin film magnetic head is set at an extremely small value with a high degree of precision by cutting the width of the pole tip in the direction of the tracks by using a focussed ion beam.

However, the grooves disclosed in the publication cited above are provided with side wall surfaces that extend almost vertically. One of the problems with grooves structured in this manner is that during magnetic recording/reproduction operation, dust collects within the grooves, causing the electromagnetic conversion characteristics of the thin film magnetic head to become unstable or, in the worst case, causing a head crash. The dust collected in the grooves includes particles of the protective film adhered to the magnetic recording medium and the substances constituting the surface of the thin film magnetic head facing opposite the medium that are released during the magnetic recording/reproduction operation as well as dust particles from the air.

As measures for solving such dust-related problems, Japanese Unexamined Patent Publication (KOKAI) No. 296907/1991 discloses a means through which dust is prevented from collecting within the grooves by having the grooves filled with an appropriate material, and a means through which an open structure is adopted for the grooves in which no dust can collect. However, in the former means, the filler material itself may become a cause for dust formation. In addition, since the grooves must be filled with the appropriate material, the number of manufacturing steps increases.

In the case of the latter means, the length of time required for machining the grooves will increase, reducing productivity. In other words, since machining with a high degree of precision is required, focussed ion beams will normally be employed. While machining, employing a focussed ion beam, the cutting rate is low. A great deal of time is required when performing machining to form grooves by cutting the slider surface, which has a high degree of resistance against wear and abrasion, with a focussed ion beam. In the case of grooves with an open structure, the machining quantity increases and, as a result, the length of machining time required for forming the grooves also increases, thus lowering productivity.

SUMMARY OF THE INVENTION

It is an object of the present invention to provide a thin film magnetic head in which the track width for recording or reproduction can be set at an extremely small value with a high degree of precision.

It is a further object of the present invention to provide a thin film magnetic head in which the grooves, which essentially define the track width, are constituted to have a shape that will not allow any dust to accumulate.

It is a still further object of the present invention to provide a thin film magnetic head in which the grooves described above can be formed within a short length of machining time.

In order to achieve the objects described above, the thin film magnetic head according to the present invention includes a slider and at least one inductive thin film magnetic conversion element. The slider is provided with an air bearing surface toward the side facing opposite the medium. The inductive thin film magnetic conversion element, which is provided on the slider, is provided with pole tips that emerge at the air bearing surface. The width of a pole tip in the direction of the tracks, which is perpendicular to the direction of the movement of the medium, is essentially defined by the grooves formed at the air bearing surface. The grooves gradually become shallower along the direction of the movement of the medium until the bottom surfaces of the grooves reach the level of the air bearing surface.

The inductive thin film magnetic conversion element, which is provided on the slider, has pole tips that emerge at the air bearing surface, and the width of the pole tip in the direction of the tracks perpendicular to the direction of the movement of the medium is essentially defined by the grooves formed at the air bearing surface. The grooves are formed by cutting the width of a pole tip in the direction of the tracks with a focussed ion beam. Consequently, the recording track width or the reproduction track width of the thin film magnetic head can be set at an extremely small value with a high degree of precision.

The grooves reach the air bearing surface while gradually becoming shallower along the direction of the movement of the medium. In combination with a magnetic recording medium (magnetic disk), the direction in which the grooves become gradually shallower in this manner matches the direction of air outflow. As a result, even if there is dust present within a groove, when a magnetic disk operates in combination with the grooves, the dust is caused to flow smoothly in the direction in which the grooves becomes gradually shallower along the direction of the movement of the medium, which matches the direction of the air outflow, so that the dust is guided to the air bearing surface and discharged to the outside. Thus, no dust is retained within the grooves.

According to the present invention, the grooves are shaped so that they become gradually shallower along the direction of the movement of the medium until their bottom surfaces reach the level of the air bearing surface, resulting in a reduced overall volume that must be cut in the machining of the grooves. Thus, the depth of the grooves relative to the air bearing surface becomes small. Because of this, even when forming grooves with a focussed ion beam, which provides a high degree of precision but provides only a small cutting quantity per unit time, the grooves can be formed in a short machining time. As for the modes to be employed for the grooves, a number of variations are possible within the range over which the requirements given above are satisfied.

According to the present invention, the thin film magnetic conversion elements where the grooves are provided are inductive thin film magnetic conversion elements. These inductive thin film magnetic conversion elements may be employed for both the write and read processes of magnetic recording. Or, an inductive thin film magnetic conversion element may be employed exclusively for write and a thin film magnetic conversion element employing the magnetoresistance effect may be provided separately for read. The inductive thin film magnetic conversion element may be constituted of one that is selected from various types of inductive thin film magnetic conversion elements that have been disclosed previously or that will be disclosed in the future. The thin film magnetic conversion element that employs the magnetoresistance effect may be constituted of one selected from various types of thin film magnetic conversion elements that have been disclosed previously or that will be disclosed in the future, such as one that employs a magnetic anisotropic magnetoresistive film such as Permalloy®, one that utilizes the giant magnetoresistance effect such as a spin valve film and the like. The slider that supports the thin film magnetic conversion element may be of the type provided with one or more rails or the type that is not provided with rails.

BRIEF DESCRIPTION OF THE DRAWINGS

More specific features and advantages of the present invention are explained in further detail in reference to the drawings, wherein.

DETAILED DESCRIPTION OF THE PREFERRED EMBODIMENTS

Figure 1:
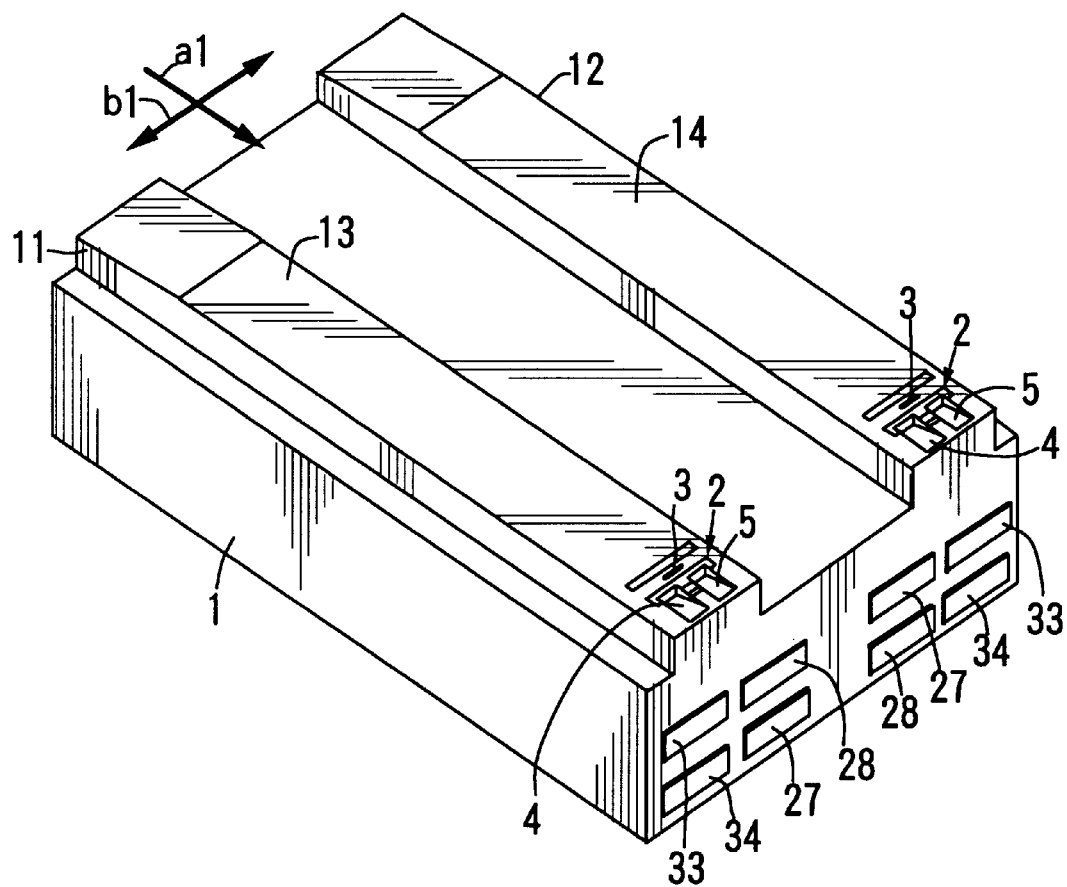
FIG. 1 is a perspective of the thin film magnetic head according to the present invention.

In reference to FIG. 1, the thin film magnetic head according to the present invention includes a slider 1, inductive thin film magnetic conversion elements 2 and thin film magnetic conversion elements 3 which utilize the magnetoresistance effect (hereafter referred to as MR thin film conversion elements). The slider 1 is provided with rail portions 11 and 12 toward the surface that faces opposite the medium, with the surfaces of the rail portions 11 and 12 constituting air bearing surfaces 13 and 14. The number of rail portions 11 and 12 is not limited to two. The slider 1 may be provided with 1 to 3 rail portions or may be a flat surface having no rail portion. In addition, various geometric contours may be achieved at the surface facing opposite the medium in order to improve the flying characteristics and the like. The present invention may be adopted in any one of these types of sliders.

The thin film magnetic conversion elements 2 and 3 are provided toward the end of one of or both of the rail portions 11 and 12 in the direction (a1) of the movement of the medium. The direction (a1) matches the direction in which the air accompanying the medium when it moves at high speed, flows out. At the end surface of the slider 1 in the direction (a1), bumps 27 and 28 connected to the thin film magnetic conversion elements 2 and bumps 33 and 34 connected to the MR thin film conversion elements 3 are provided.

Figure 2:
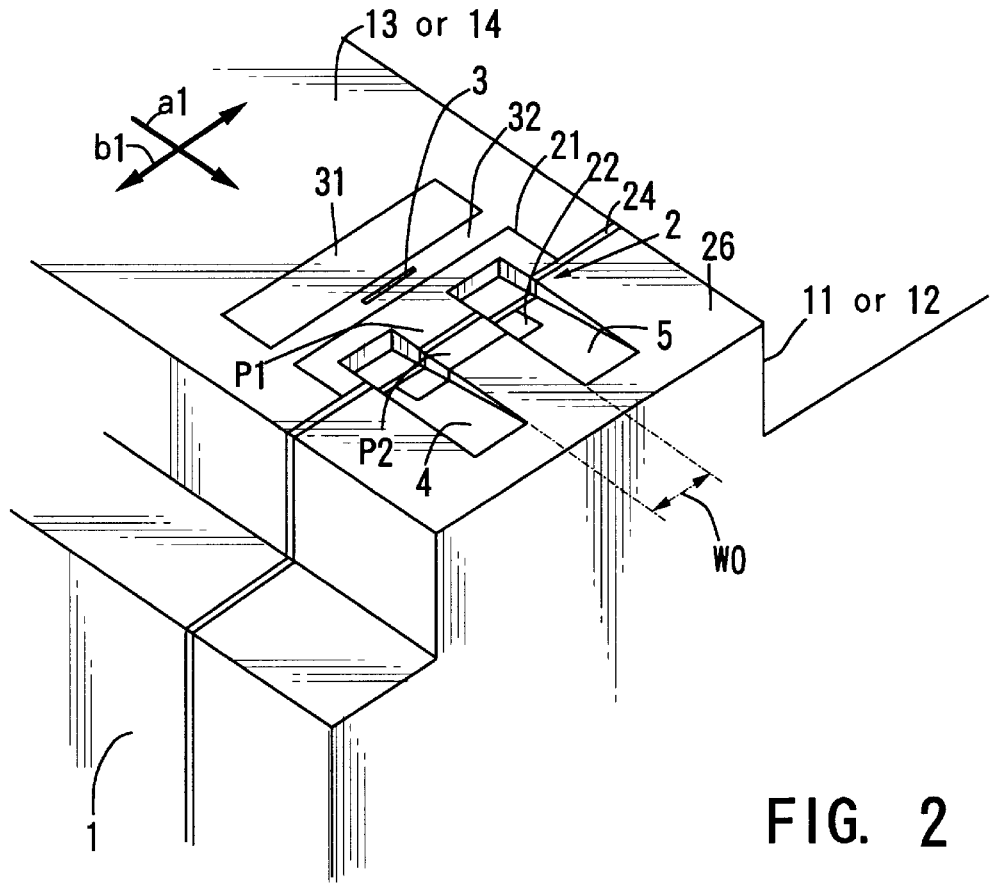
FIG. 2 is a perspective showing an enlargement of a portion of the thin film magnetic head shown in FIG. 1.

In reference to FIG. 2, the inductive thin film magnetic conversion elements 2 are each provided with a lower pole tip P1 and an upper pole tip P2 that emerge at the air bearing surfaces 13 and 14. The width W0 in the direction (b1) of the tracks which is perpendicular to the direction (a1) of the lower pole tip P1 and the upper pole tip P2 is essentially defined by the grooves 4 and 5 provided at the air bearing surfaces 13 and 14. The grooves 4 and 5 gradually become shallower along the direction (a1) until their bottom surfaces reach the level of the air bearing surfaces 13 and 14. The lower pole tip P1 and the upper pole tip P2 face opposite each other across a gap film 24.

Figure 3:
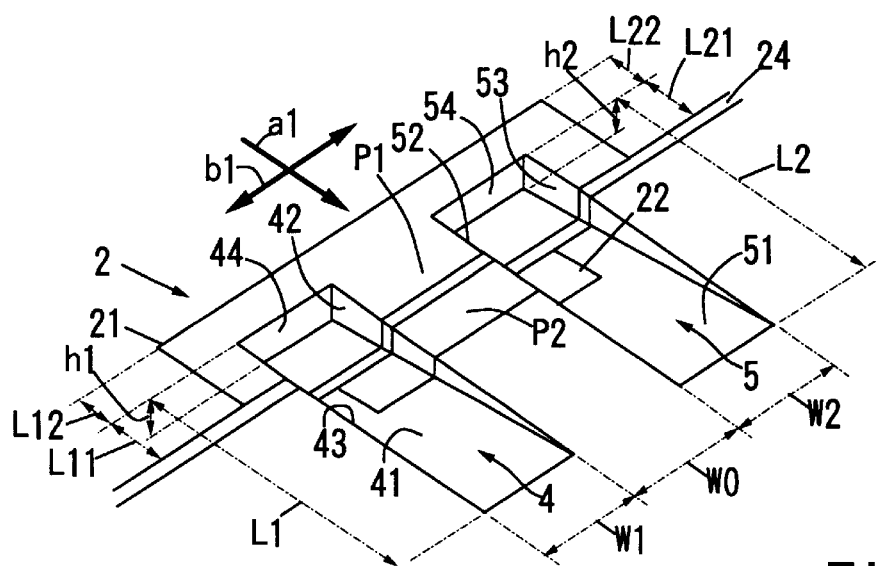
FIG. 3 is an enlarged perspective of a thin film magnetic conversion element portion in FIG. 2.

In reference to FIG. 3, the grooves 4 and 5 are provided at the two sides in the direction (b1), delimiting the lower pole tip P1 and the upper pole tip P2. In addition, the grooves 4 and 5 each include four surfaces. In the groove 4, a first surface 41 is an inclined surface which becomes gradually shallower along the direction (a1), with its maximum depth relative to the air bearing surfaces 13 and 14 at h1. A second surface 42 and a third surface 43 each rise up from either side of the first surface 41, which has a width W1, and these surfaces extend along the direction (a1) to a length L1. A fourth surface 44 rises up from the rear end of the first surface 41, with its maximum depth at h1. The fourth surface 44 is formed at a distance L11 beyond the gap film 24. Behind the fourth surface 44, the lower pole tip P1 is allowed to have a thickness L12. The dimensions L11 and L12 are set by taking into consideration the electromagnetic conversion characteristics and the like. While the first surface 41 to the fourth surface 44 in this embodiment are constituted as flat surfaces, they may be constituted as convex or concave surfaces with large or small curvatures.

In the groove 5, a first surface 51 is an inclined surface whereby the maximum depth h2 relative to the air bearing surfaces 13 and 14 becomes gradually shallower along the direction (a1). A second surface 52 and a third surface 53 each rise up from either side of the first surface 51, which has a width W2, and these surfaces extend along the direction (a1) to a length L2. A fourth surface 54 rises up from the rear end of the first surface 51, with its maximum depth at h2. The fourth surface 54 is formed at a distance L21 beyond the gap film 24. Behind the fourth surface 54, the lower pole tip P1 is allowed to have a thickness L22. The dimensions L21 and L22 are set by taking into consideration the electromagnetic conversion characteristics and the like. While the first surface 51 to the fourth surface 54 in this embodiment are constituted as flat surfaces, they may be constituted as convex or concave surfaces with large or small curvatures. While the groove 5 is identical to the groove 4 in shape in this embodiment, they may have different shapes. In addition, either one of the grooves 4 and 5 may be omitted.

As explained above, the thin film magnetic conversion elements 2, which are positioned on the slider 1, are each provided with the lower pole tip P1 and the upper pole tip P2, which emerge at the air bearing surfaces 13 and 14, and the width W0 of the lower pole tip P1 and the upper pole tip P2 in the direction (b1), which is perpendicular to the direction (a1), is essentially defined by the grooves 4 and 5 formed at the air bearing surfaces 13 and 14. The grooves 4 and 5 are formed by cutting (to be detailed later) the width W0 in the direction (b1) of the lower pole tip P1 and the upper pole tip P2 with a focussed ion beam. As a result, the recording track width or reproduction track width W0 of the thin film magnetic head can be set at an extremely small value with high precision.

The grooves 4 and 5 gradually become shallower along the direction (a1) until their bottom surfaces reach the level of the air bearing surfaces 13 and 14. When the grooves 4 and 5 thus shaped are combined with a magnetic recording medium (magnetic disk), the direction in which they become gradually shallower matches the direction (a1), i.e., the direction of the air outflow. Consequently, even when dust is present inside the grooves 4 and 5, in combination with the magnetic disk, the dust is allowed to flow smoothly in the direction in which the grooves become gradually shallower along the direction of air outflow (the direction of the movement of the medium) (a1) to be guided to the air bearing surfaces 13 or 14 and finally to be discharged to the outside. Thus, no dust collects inside the grooves 4 and 5. The maximum depths h1 and h2, the widths W1 and W2 and the lengths L1 and L2 of the grooves 4 and 5, which determine the angle of inclination of the first surfaces 41 and 51, are selected so that an inclination that is suited for discharging dust is achieved.

According to the present invention, since the grooves 4 and 5 are shaped so that they gradually become shallower along the direction (a1) until their bottom surfaces reach the level of the air bearing surfaces 13 and 14, the entire volume that must be cut in the groove machining process is reduced. Because of this, even when the grooves 4 and 5 are to be formed with a focussed ion beam, which offers only a small cutting quantity per unit time, the grooves 4 and 5 can be formed within a short length of machining time and with great precision.

Figure 4:
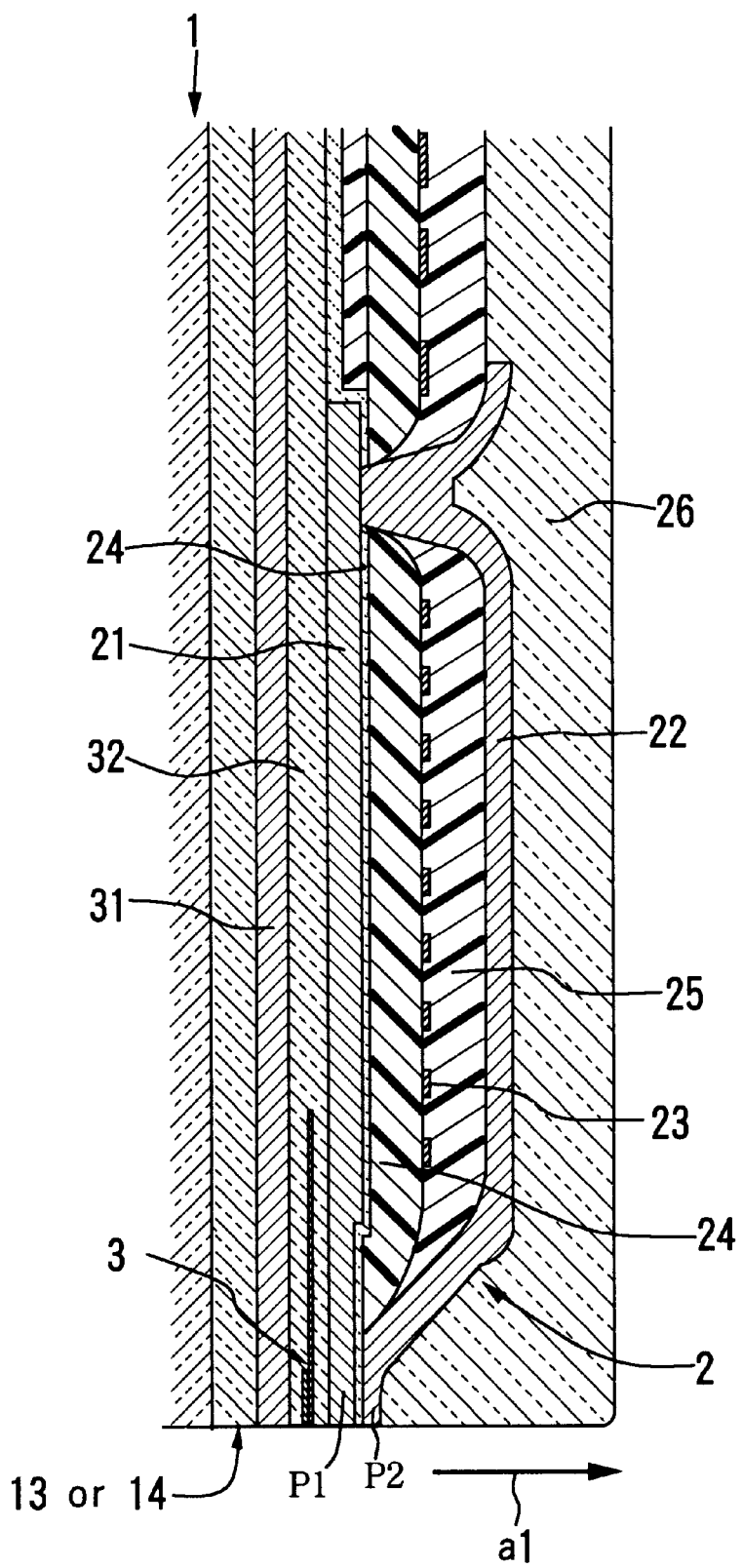
FIG. 4 is an enlarged cross section of the thin film magnetic head shown in FIG. 1.

In reference to FIG. 4, the inductive thin film magnetic conversion element 2 is a write element whereas the MR thin film conversion element 3 is a read element.

The inductive thin film magnetic conversion element 2, which constitutes the write element, is provided with a lower magnetic film 21 that also functions as an upper shield film for the MR thin film conversion element 3, an upper magnetic film 22, a coil film 23, the gap film 24 constituted of alumina or the like, an insulating film 25 constituted of an organic resin such as Novolak® and a protective film 26 constituted of alumina or the like. The front end portions of the lower magnetic film 21 and the upper magnetic film 22 constitute the lower pole tip P1 and the upper pole tip P2 which face opposite each other across the gap film 24 with a very small thickness, and a write is performed at the lower pole tip P1 and the upper pole tip P2. The yolked portions of the lower magnetic film 21 and the upper magnetic film 22 are linked to each other so that they complete a magnetic circuit at the back gap portion which is on the opposite side from the lower pole tip P1 and the upper pole tip P2. The coil film 23 is formed in such a manner that it winds around the linking area of the yolked portions in a coil, on the insulating film 25. The two ends of the coil film 23 are electrically continuous to the bumps 27 and 28 (see FIG. 1). The number of coils and the number of layers of the coil film 23 are arbitrary.

Various film structures have been disclosed and put into practical use that may constitute the MR conversion elements 3. They include, for instance, a structure that employs an anisotropic magnetoresistive element constituted of Permalloy® or the like and a structure that employs a giant magnetoresistive (GMR) film. Any one of these structures may be adopted in the present invention. The MR thin film conversion element 3 is positioned inside an insulating film 32 between the lower shield film 31 and the lower magnetic film 21, which also functions as the upper shield film. The insulating film 32 may be constituted of alumina or the like. The MR thin film conversion element 3 is connected to bumps 33 and 34 (see FIG. 1). Unlike this embodiment, only the inductive thin film magnetic conversion element 2 may be provided, to be employed as a read/write element.

In the embodiment, the width W0 of both the lower pole tip P1 and the upper pole tip P2 in the direction (b1) is essentially defined by the grooves 4 and 5. Alternatively, a structure in which the width W0 in the direction (b1) of at least one of either the lower pole tip P1 and the upper pole tip P2, i.e., only the lower pole tip P1, is essentially defined by the grooves 4 and 5 may be adopted.

The grooves 4 and 5 partially cut into the lower magnetic film 21 in the direction of its thickness which is taken in the direction (a1), and also cut into the upper magnetic film 22 in the direction of its thickness over its entire range.

Figure 5:
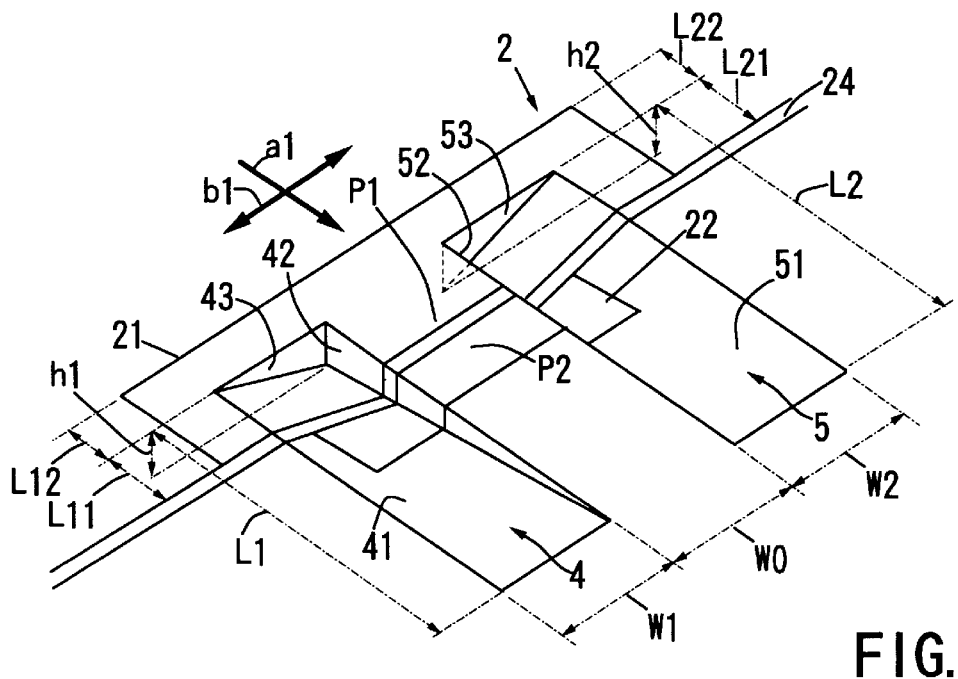
FIG. 5 is an enlarged perspective of a thin film magnetic conversion element portion in another embodiment of the thin film magnetic head according to the present invention.

In reference to FIG. 5, in which the same reference numbers are assigned to components that are identical to those in FIGS. 1 to 4, grooves 4 and 5 each include three surfaces. A first surface 41 of the groove 4 is an inclined surface that becomes gradually shallower along the direction (a1) and in the direction (b1) from the maximum depth h1 relative to the air bearing surface 13. A second surface 42, which rises up from one of the lateral sides of the first surface 41, extends along the direction (a1). A third surface 43 rises up from the rear end of the first surface 41 with its maximum depth at h1. With this, the groove 4 with a width W1, a length L1 and a maximum depth h1 is achieved.

The first surface 51 of the groove 5 is an inclined surface with its depth h2 relative to the air bearing surface 14 becoming gradually smaller along the direction (a1) and in the direction (b1). A second surface 52, which rises up from one of the lateral sides of the first surface 51, extends along the direction (a1). A third surface 53 rises up from the rear end of the first surface 51. With this, the groove 5 with a width W2, a length L2 and a maximum depth h2 is achieved.

Figure 6:
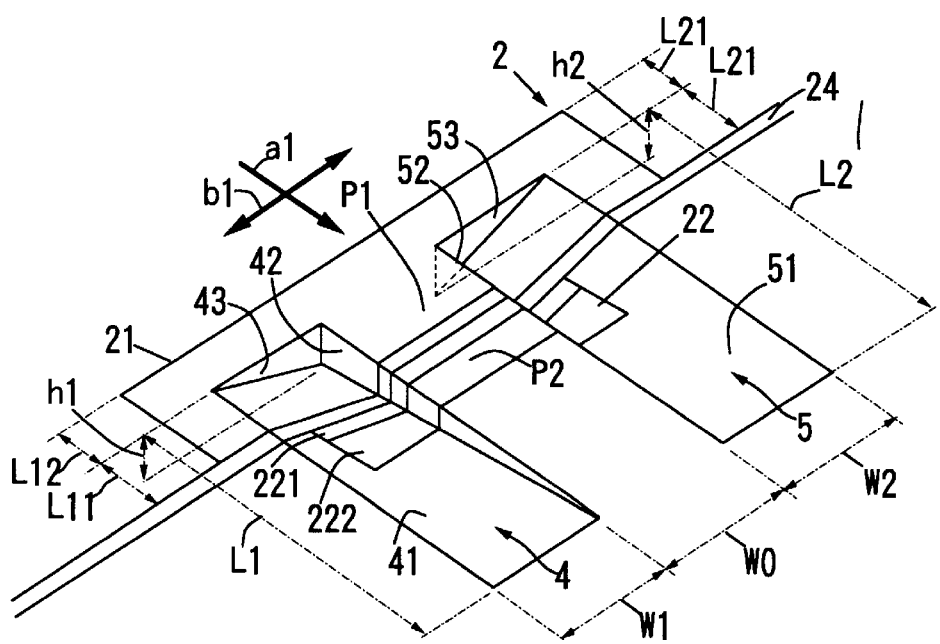
FIG. 6 is an enlarged perspective of a thin film magnetic conversion element portion in another embodiment of the thin film magnetic head according to the present invention.

In FIG. 6, the same reference numbers are assigned to components that are identical to those in FIG. 5, the structure and shape of the grooves 4 and 5 are identical to those employed in the embodiment shown in FIG. 5. Of the lower magnetic film 21 and the upper magnetic film 22, the upper magnetic film 22 is provided with a first magnetic layer 221 that comes in contact with the gap film 24 at the pole tip P2, and a second magnetic layer 222 that is laminated onto the first magnetic layer 221. By employing this structure, a required improvement in characteristics can be achieved through differentiating the material characteristics of the first magnetic layer from the material characteristics of the second magnetic layer.

For instance, the saturation magnetization of the first magnetic layer 221 may be selected at a value that is greater than the saturation magnetization of the second magnetic layer 222. By doing this, the high frequency recording characteristics can be improved. As another means for improving the high frequency recording characteristics, setting the specific resistance of the first magnetic layer 221 greater than the specific resistance of the second magnetic layer 222 also proves effective.

It is also effective to ensure that the level of resistance against wear and abrasion of the first magnetic layer 221 is higher than the resistance against wear and abrasion of the second magnetic layer 222. In this case, the first magnetic layer 221, which is placed adjacent to the gap film 24 and essentially defines the thickness of the gap, is prevented from becoming worn and abraded, thereby achieving stable electromagnetic conversion characteristics.

In consideration of the manufacturing processes employed to produce this type of thin film magnetic head, it is desirable to provide the first magnetic layer 221 and the second magnetic layer 222 over the entirety of the upper magnetic film 22. In addition, although not shown in the figure, the groove structure illustrated in FIGS. 1 to 4 may be adopted.

Figure 7:
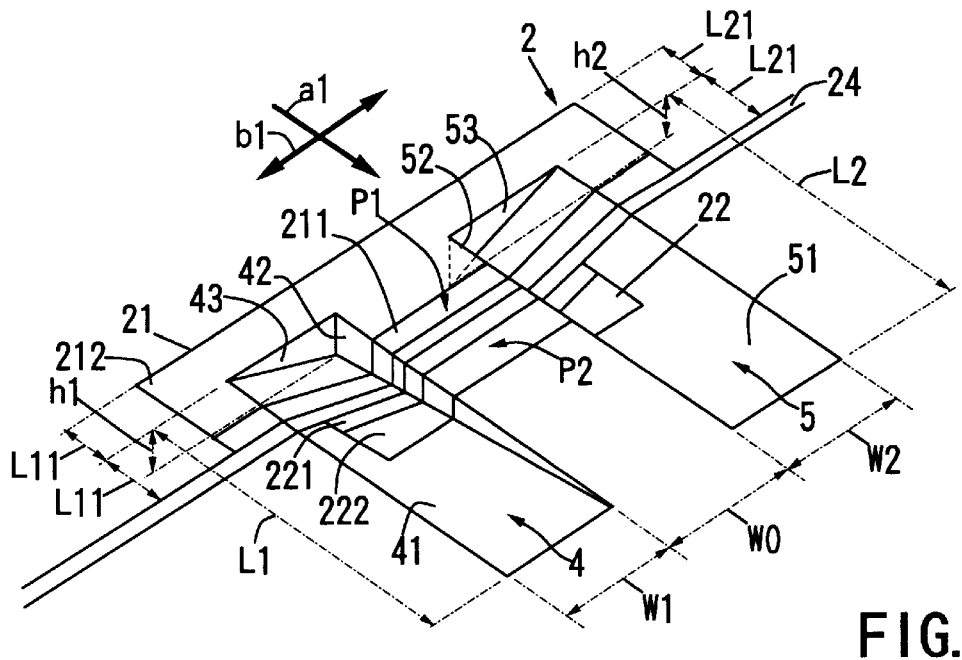
FIG. 7 is an enlarged perspective of a thin film magnetic conversion element in another embodiment of the thin film magnetic head according to the present invention.

In FIG. 7, the same reference numbers are assigned to components that are identical to those in FIG. 6, the structure and shape of the grooves 4 and 5 are identical to those employed in the embodiment shown in FIG. 6. What differentiates this embodiment from the embodiment shown in FIG. 6 is that the lower pole tip P1 at the lower magnetic film 211, too, is constituted by laminating a first magnetic layer 211 and a second magnetic layer 212. The materials for the first magnetic layer 211 and the second magnetic layer 212 are selected to ensure that they achieve a relationship identical to that between the first magnetic layer 221 and the second magnetic layer 222 at the upper pole tip P2. Although not shown, the groove structure illustrated in FIGS. 1 to 4 may be adopted.

Figure 8:
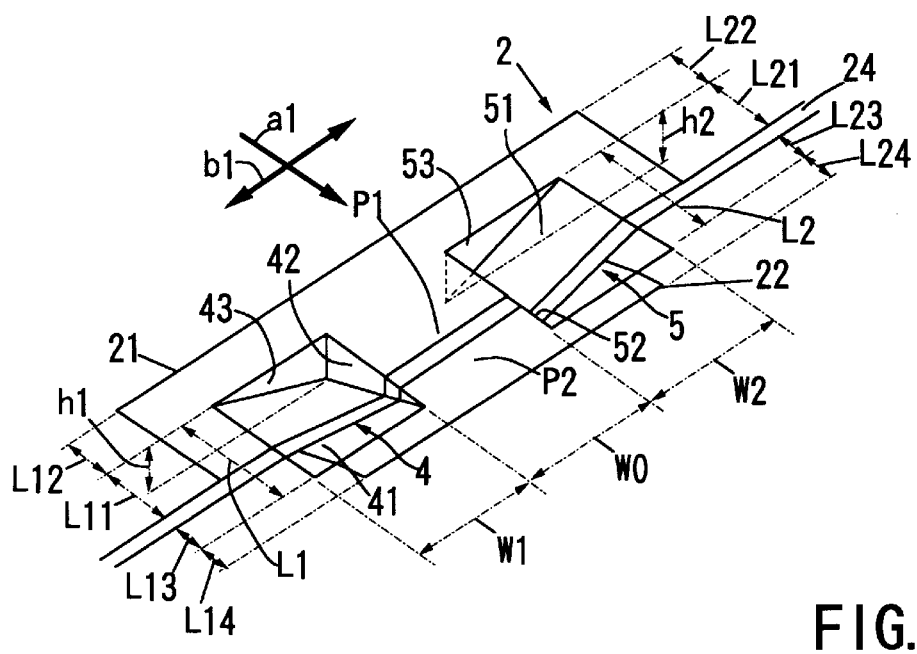
FIG. 8 is an enlarged perspective of a thin film magnetic conversion element portion in another embodiment of the thin film magnetic head according to the present invention.

FIG. 8 is an enlarged perspective of a thin film magnetic conversion element 2 in another embodiment of the thin film magnetic head according to the present invention. In the figure, the same reference numbers are assigned to the components that are identical to those shown in FIGS. 1 to 4 and their detailed explanation is omitted. The grooves 4 and 5 partially cut into the lower magnetic film 21 and the upper magnetic film 22 in the direction of the thickness which is taken in the direction (a1). In other words, the grooves 4 and 5 are made to begin part way through the lower magnetic film 21 and end part way through the upper magnetic film 22. With this, a groove 4 with a width W1, a length L1 and a maximum depth h1 and a groove 5 with a width W2, a length L2 and a maximum depth h2 are achieved.

The groove 4 is formed in such a manner that its third surface 43 is provided at a position away from the gap film 24 by a distance L11 and a pole tip thickness of L12 remains to the rear of the third surface 43 at the lower pole tip P1. In addition, it is formed to ensure that at the upper pole tip P2, the first surface 41 ends at a position that is away from the gap film 24 by a distance L13 with a pole tip thickness of L14 remaining to the front of it.

The groove 5 is formed in such a manner that its third surface 53 is provided at a position away from the gap film 24 by a distance L21 and a pole tip thickness of L22 remains to the rear of the third surface 53 at the lower pole tip P1. In addition, it is formed to ensure that at the upper pole tip P2, the first surface 51 ends at a position that is away from the gap film 24 by a distance L23 with a pole tip thickness of L24 remaining to the front of it.

It goes without saying that advantages similar to those achieved in the embodiment shown in FIGS. 1 to 4 are achieved in the embodiments illustrated in FIGS. 5 to 8. Generally speaking, in each embodiment, the respective widths W1 and W2, lengths L1 and L2 and maximum depths h1 and h2 of the two grooves 4 and 5 are set the same, but they may be different from each other.

Figure 9:
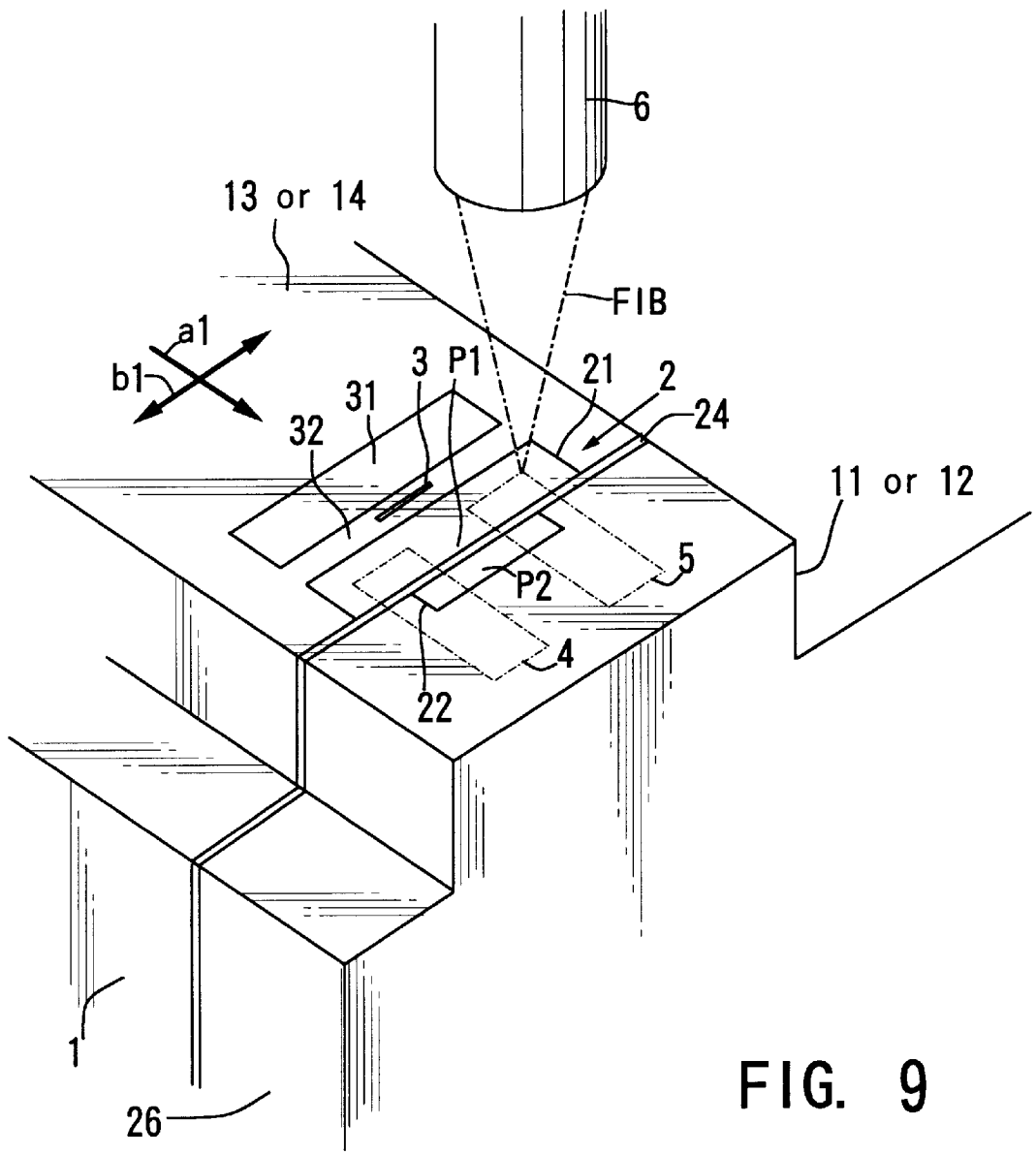
FIG. 9 illustrates a method for machining the thin film magnetic head according to the present invention.

As shown in FIG. 9, a focussed ion beam FIB is irradiated from a focussed ion beam apparatus 6 onto areas where the grooves 4 and 5 are to be formed on the air bearing surface 13 or 14 of the thin film magnetic head. The focussed ion beam FIB is scanned in the direction (a1) and the direction (b1) on the air bearing surface 13 or 14 to achieve the required shape, depth and the like of the grooves. The depth of the grooves 4 and 5 thus achieved can be adjusted by controlling the scanning speed, the accelerating voltage or the beam current of the focussed ion beam. For instance, if the scanning speed of the focussed ion beam FIB is constant, the depths of the grooves 4 and 5 can be controlled so that they will satisfy the requirements of the present invention by adjusting the accelerating voltage or the beam current. If the accelerating voltage or the beam current is constant, the scanning speed of the focussed ion beam FIB is controlled. The scanning speed, the accelerating voltage or the beam current of the focussed ion beam may be adjusted with ease by employing a focussed ion beam apparatus that is provided with a program function.

Next, the advantages of the thin film magnetic head according to the present invention are explained in specific terms in comparison with examples for comparison.

Example for Comparison 1

Figure 10:
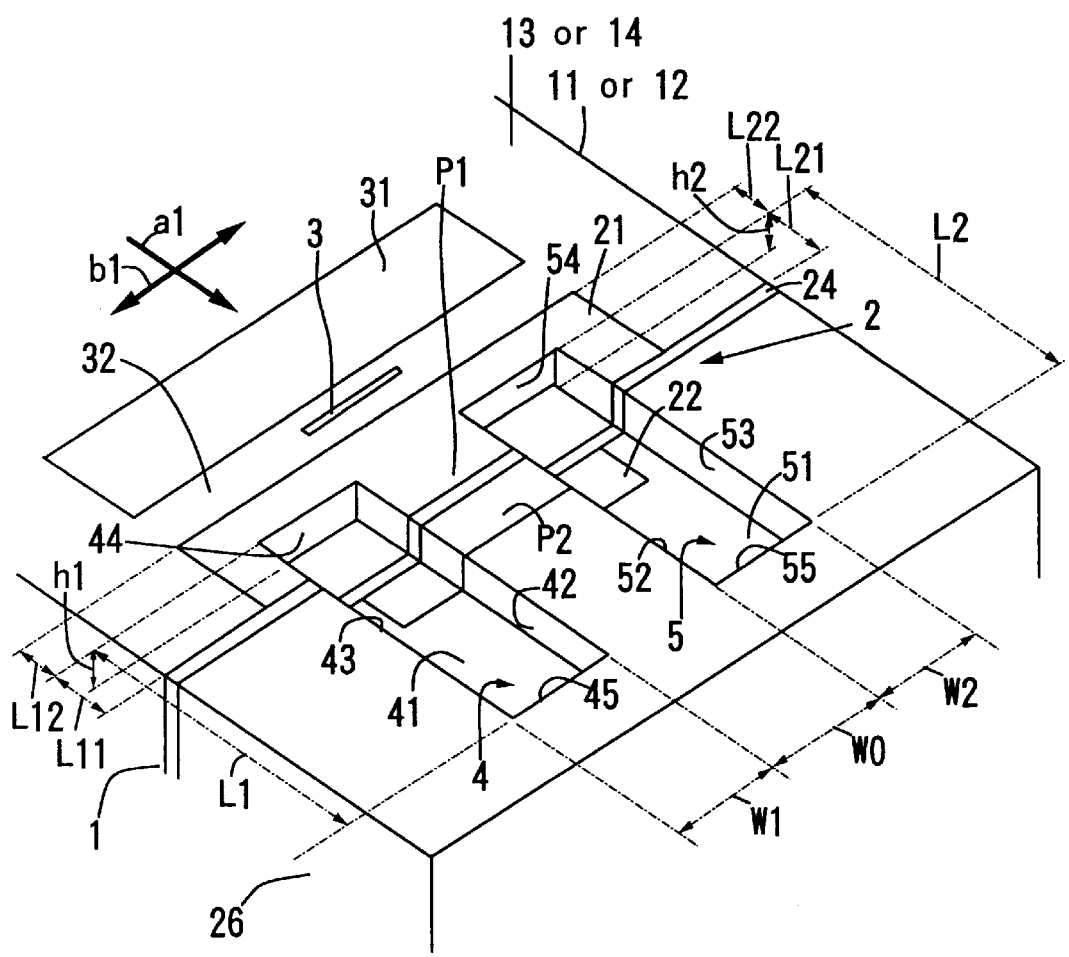
FIG. 10 is a perspective showing an enlargement of a portion of a thin film magnetic head in the prior art.

FIG. 10 is an enlarged perspective of the thin film magnetic conversion element portion of a thin film magnetic head used for comparison. The structure of the thin film magnetic conversion element is as shown in FIG. 4. A groove 4 is provided with 5 surfaces 41 to 45. The first surface 41 constitutes the bottom surface, which extends almost parallel to the air bearing surface 13 or 14. The second surface 42 through the fifth surface 45 constitute wall surfaces that are perpendicular to the first surface 41. The thickness of the lower magnetic film 21, which also constitutes the upper shield film, is set at 3.5 $\mu$m with the thickness of the upper magnetic film 22 also set at 3.5 $\mu$m. The thickness of the gap film 24 is set at 0.4 $\mu$m. The focussed ion beam machining illustrated in FIG. 9 was performed on the lower pole tip P1 of the lower magnetic film 21 and the upper pole tip P2 of the upper magnetic film 22 described above. The focussed ion beam machining was performed with the accelerating voltage at 40 kV, the beam current at 5 nA and the beam diameter at 0.02 $\mu$m. The dimensions of the grooves 4 and 5 thus achieved are as follows:

W1=W2=3 $\mu$m

L1=L2=6 $\mu$m h1=h2=1 $\mu$m

L11=L21=2 $\mu$m

L12=L22=1.5 $\mu$m

W0=1.0 $\mu$m

Embodiment 1

The grooves 4 and 5 shown in FIGS. 1 to 3 were formed in a thin film magnetic head otherwise identical to that in Example for Comparison. When forming the grooves 4 and 5, the accelerating voltage and the beam current at the focussed ion beam apparatus 6 illustrated in FIG. 9 were gradually shifted from 40 kV–50 nA to 0 kV–0 nA. The scanning speed of the focussed ion beam FIB was maintained at a constant level. The volumes of the grooves 4 and 5 thus achieved are approximately 50% of those in Example for Comparison. The dimensions of the grooves 4 and 5 are the same as those in Example for Comparison.

Embodiment 2

The grooves 4 and 5 shown in FIG. 5 were formed in a thin film magnetic head otherwise identical to that in Example for Comparison. The grooves 4 and 5 were machined under conditions that were identical to those employed in Embodiment 1. The volumes of the grooves 4 and 5 thus achieved are approximately 25% of those in Example for Comparison. The dimensions of the grooves 4 and 5 are the same as those in Example for Comparison.

Contact Start Stop (hereafter referred to as CSS) tests were performed on the thin film magnetic heads in Example for Comparison and in Embodiments 1 and 2 described above, and Table I lists the state of the resulting dust adhesion and the number of CSS cycles that were implemented until the electromagnetic conversion characteristics of each thin film magnetic head became unstable.

TABLE I

| | Number of CSS cycles at which the charactetistics started to become unstable | | | |
|---|---|---|---|---|
| | Minimum (cycles) | Maximum (cycles) | Average (cycles) | Dust adhesion |
| Example for Comparison | 3000 | 6000 | 4500 | yes |
| Embodiment 1 | 50000 or more | 50000 or more | 50000 or more | no |
| Embodiment 2 | 50000 or more | 50000 or more | 50000 or more | no |

As is clear from Table I, while the number of CSS cycles at which the characteristics became unstable averages 4500 in Example for Comparison, a significant improvement is achieved in Embodiments 1 and 2 according to the present invention, at 50000 cycles or more. In addition, although dust adhesion was observed in Example for Comparison, no dust adhesion was observed in Embodiments 1 and 2.

Embodiment 3

In the thin film magnetic head shown in FIG. 6, the first magnetic layer 221 of the upper magnetic film 22 is constituted of FeZrN (Bs=15 kG, Hv=1500, $\rho=100\ \mu\Omega$) formed through sputtering, having a film thickness of 0.5 $\mu$m, and the second magnetic layer 222 is constituted of a NiFe film (Bs=9.0 kG, Hv=250, $\rho=25\ \mu\Omega$) with a film thickness of 3.0 $\mu$m, which is formed through plating. Both the saturation magnetization Bs and the specific resistance are greater in the first magnetic layer 221 than in the second magnetic layer 222.

Embodiment 4

In the thin film magnetic head shown in FIG. 7, the upper magnetic film 22 has a structure identical to that in embodiment 3. The lower magnetic film 21, too, is structured identically to the upper magnetic film 22.

Example for comparison 2

A thin film magnetic head which has grooves structured identically to those in embodiment 3 and 4 but employs a single-layer structure for both the lower magnetic film 21 and the upper magnetic film 22 (the thin film magnetic head shown in FIG. 5) was prepared, High frequency recording characteristics tests were performed on the thin film magnetic heads in Embodiments 3 and 4 and Example for Comparison 2. Magnetic disks with Hc=2500 Oe and tBr=80 G $\mu$ were used in the tests. The magnetic disks were rotated at 7200 rpm. The thin film magnetic heads were operated at a flying height of 50 nm with the recording current applied at 40 $mA_{0-P}$. The resulting D50 (kFCI) are listed in Table II.

TABLE II

| | D50 (kFCI) |
|---|---|
| Example for Comparison 2 | 110 |
| Embodiment 3 | 150 |
| Embodiment 4 | 160 |

As indicated in Table II, the high frequency recording characteristics are improved with the magnetic film with a saturation magnetization Bs and a specific resistance formed in the area that comes in contact with the gap film 24. The materials that are suited for constituting the first magnetic layers 211 and 221 that come in contact with the gap film 24 include FeCo, FeCoNi, FeMN, FeMC (M=Ta, Hf, Mo, W, B, Si, Al) and amorphous magnetic material as well as those employed in Embodiments 3 and 4.

In the structure shown in FIG. 8, the volumes of the grooves 4 and 5 can be reduced to a great degree. For instance, when the dimensions of the grooves 4 and 5 in FIG. 8 are set as follows within a feasible range:

W1=W2=3 $\mu$m

L1=L2=2.4 $\mu$m h1=h2=1 $\mu$m

L11=L21=2 $\mu$m

L13=L23=1.5 $\mu$m

The volumes can be reduced to approximately ⅙ of those of the grooves 4 and 5 with the dimensions set in Example for Comparison 1, further improving productivity.

While the present invention has been explained in detail in reference to specific preferred embodiments, it is obvious to persons skilled in the art that a number of variations are possible in its form and detail without departing from the essence and range of the present invention.

What is claimed is:

1. A thin film magnetic head comprising:

a slider having a leading edge and a trailing edge and having an air bearing surface; and at least one inductive thin film magnetic conversion element disposed on said slider, and having first and second pole tips and a gap therebetween, the first pole tip being closer to the leading edge than the second pole tip, wherein:

a width of the gap in a direction perpendicular to a direction from the leading edge to the trailing edge of the slider is essentially defined by grooves formed in said air bearing surface, the grooves extending from within the first pole tip through the gap and towards the trailing edge; and each of said grooves become gradually shallower along said direction from the leading edge of the groove to the trailing edge of the groove of said slider until a bottom surface of said grooves reaches flush with said air bearing surfaces at a region located passed the second pole tip.

2. A thin film magnetic head according to claim 1, wherein:

said grooves are disposed at either side of said respective pole tips in said direction perpendicular to said direction from the leading edge to the trailing edge of said slider.

3. A thin film magnetic head according to claim 2, wherein:

said grooves each include:

a first surface including an inclined surface whose depth relative to said air bearing surface gradually becomes smaller along said direction from the leading edge to the trailing edge of said slider;

a second surface and a third surface rising from respective sides of said first surface, said second surface and said third surface being in said direction perpendicular to said direction from the leading edge to the trailing edge of said slider and extending along said direction from the leading edge to the trailing edge of said slider; and a fourth surface rising from a rearward side of said first surface, said rearward side being in a direction opposite of said direction from the leading edge to the trailing edge of said slider.

4. A thin film magnetic head according to claim 2, wherein:

said grooves are formed with a focused ion beam.

5. A thin film magnetic head according to claim 1, wherein:

said at least one inductive thin film magnetic conversion element includes a thin film magnetic circuit having a lower magnetic film, an upper magnetic film and a coil film;

said lower magnetic film and said upper magnetic film respectively include a lower pole tip and an upper pole tip facing opposite each other across a gap film; and a width of at least either said lower pole tip or said upper pole tip in said direction perpendicular to said direction from the leading edge to the trailing edge of said slider is essentially defined by said grooves.

6. A thin film magnetic head according to claim 5, wherein:

the width of said lower pole tip in said direction of said tracks is essentially defined by said grooves.

7. A thin film magnetic head according to claim 5, wherein:

the width of said lower pole tip and said upper pole tip in said direction of said tracks is essentially defined by said grooves.

8. A thin film magnetic head according to claim 5, wherein:

said grooves partially cut into said lower magnetic film and said upper magnetic film in a direction of a thickness thereof, which is defined in said direction from the leading edge to the trailing edge of said slider, and cross said upper magnetic film in the direction of the thickness thereof.

9. A thin film magnetic head according to claim 5, wherein:

said grooves partially cut into said lower magnetic film and said upper magnetic film in a direction of a thickness thereof, which is defined in said direction from the leading edge to the trailing edge of said slider.

10. A thin film magnetic head according to claim 5, wherein:

at least either said lower magnetic film or said upper magnetic film includes a first magnetic layer contacting said gap film at said pole tips and a second magnetic layer laminated onto said first magnetic layer; and material characteristics of said first magnetic layer differ from material characteristics of said second magnetic layer.

11. A thin film magnetic head according to claim 10, wherein:

a saturation magnetization of said first magnetic layer is greater than a saturation magnetization of said second magnetic layer.

12. A thin film magnetic head according to claim 10, wherein:

a specific resistance of said first magnetic layer is greater than a specific resistance of said second magnetic layer.

13. A thin film magnetic head according to claim 10, wherein:

a resistance against wear and abrasion of said first magnetic layer is greater than a resistance against wear and abrasion of said second magnetic layer.

14. A thin film magnetic head according to claim 1, further comprising:

a thin film magnetic conversion element utilizing magnetoresistance.

15. A thin film magnetic head according to claim 1, wherein:

said grooves each include;

a first surface including an inclined surface whose depth relative to said air bearing surface gradually becomes smaller along said direction from the leading edge to the trailing edge of said slider;

a second surface and a third surface rising from respective sides of said first surface, said second surface and said third surface being in said direction perpendicular to said direction from the leading edge to the trailing edge of said slider and extending along said direction from the leading edge to the trailing edge of said slider; and a fourth surface rising from a rearward side of said first surface, said rearward side being in a direction opposite of said direction from the leading edge to the trailing edge of said slider.

16. A thin film magnetic head according to claim 1, wherein:

said grooves each include;

a first surface including an inclined surface whose depth relative to said air bearing surface gradually becomes smaller along said direction from the leading edge to the trailing edge of said slider;

a second surface rising from said first surface at a lateral side adjacent to said pole tips, and extending along said direction from the leading edge to the trailing edge of said slider; and a third surface rising from a rearward side of said first surface, said rearward side being in a direction opposite of said direction from the leading edge to the trailing edge of said slider.

17. A thin film magnetic head according to claim 2, wherein:

said grooves each include:

a first surface including an inclined surface whose depth relative to said air bearing surface gradually becomes smaller along said direction from the leading edge to the trailing edge of said slider;

a second surface rising from said first surface at a lateral side adjacent to said pole tips, and extending along said direction from the leading edge to the trailing edge of said slider; and a third surface rising from a rearward side of said first surface, said rearward side being in a direction opposite of said direction from the leading edge to the trailing edge of said slider.

18. A method of manufacturing a thin film magnetic head comprising:

providing a slider having a leading edge and a trailing edge and having an air bearing surface;

disposing on said slider at least one inductive thin film magnetic conversion element having first and second pole tips and a gap therebetween the first pole tip being closer to the leading edge than the second pole tip; and forming grooves, with a focused ion beam, in the air bearing surface so that a width of the gap in a direction perpendicular to a direction from the leading edge to the trailing edge of the slider is essentially defined by the grooves the grooves extending from within the first pole tip through the gap and towards the trailing edge, and so that each of the grooves become gradually shallower along said direction from the leading edge of the groove to the trailing edge of the groove of said slider until a bottom surface of said grooves reaches flush with said air bearing surface.

* * * * *